United States Patent [19]

Ismail et al.

[11] 3,875,110

[45] Apr. 1, 1975

[54] STABILIZERS FOR CHLORINE-CONTAINING POLYMERS

[75] Inventors: Mohamed Roshdy Ismail, Spich; Hans Raalf, Troisdorf, both of Germany

[73] Assignee: Dynamit Nobel AG, Cologne, Germany

[22] Filed: Mar. 11, 1970

[21] Appl. No.: 23,522

Related U.S. Application Data

[62] Division of Ser. No. 640,375, May 22, 1967, abandoned.

[30] Foreign Application Priority Data

May 20, 1966 Germany.................................. 50156

[52] U.S. Cl... 260/45.75 Z, 260/45.8 N, 260/514 G
[51] Int. Cl........................ C08f 45/62, C08f 45/60
[58] Field of Search ................. 260/45.75 K, 45.8 N

[56] References Cited
UNITED STATES PATENTS
3,208,966   9/1965   Molt et al. ........................ 260/45.8

Primary Examiner—V. P. Hoke
Attorney, Agent, or Firm—Burgess, Dinklage & Sprung

[57] ABSTRACT

This specification discloses a novel class of light and heat stabilizers particularly useful with chlorinated polymers. These new compounds have the general formula:

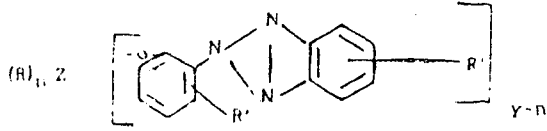

wherein Z is silicon or tin; n is 0 to 3, and R' is substantially any organic radical. The two R' can be the same or different. Some specific compounds include di-n-butyl-di-(benzotriazo-phenoxy-2)-tin; and dimethyl-di-(benzotriazo phenoxy-2-)silane. These novel compounds can be made by the reaction of benzotriazo phenols with various reactive silane or tin compounds, e.g., halides, etc. The polymers which can be stabilized include polyvinyl chlorides, polyvinylidene chlorides, poly-chloroprenes, chlorinated styrene polymers, chlorinated acrylic polymers, etc.

6 Claims, No Drawings

STABILIZERS FOR CHLORINE-CONTAINING POLYMERS

This is a divisional application of Ser. No. 640,375, of May 22, 1967, now abandoned.

Chlorinated polymers of various types are generally known in the art. It is further known that polymers containing chlorine are not as resistant to light, heat and oxygen as might be desired. It is also known that certain compounds act to prevent the deterioration of chlorine containing polymers by reason of their exposure to light, heat or oxygen.

The deterioration referred to above often acts to impair the mechanical and electrical properties of the polymer, as well as the appearance and workability thereof. One particular area of difficulty is connected with ultraviolet radiation having a wavelength in the range of 2,000 to 4,000 Angstroms. Such radiation often results in more or less rapid discoloration, usually accompanied by a gradual decomposition.

Compounds that are very different from one another chemically have been proposed as stabilizers for such polymers, but usually they are not equally effective against all three of the adverse influences in question, and stabilizers which provide the polymers with satisfactory protection against the influence of both heat and oxygen, as well as light, are largely unknown.

It is therefore an object of this invention to provide a novel class of compounds.

It is another object of this invention to provide such a novel class of compounds which are suitable for use as both heat and ultra-violet stabilizers in connection with chlorine-containing polymers.

Other and additional objects of this invention will become apparent from a consideration of this entire specification, including the claims appended hereto.

In accord with and fulfilling those objects, one aspect of this invention resides in the novel class of compounds:

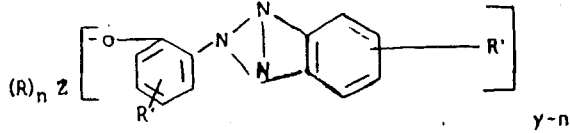

wherein Z is silicon or tin; $n$ is 0 to 3, R is at least one organic moiety selected from the group consisting of alkyl, aryl, cycloalkyl, aryloxy, and halogenated aryloxy, and R' may be the same or different and may be at least one selected from the group consisting of hydrogen, alkyl, aryl, alkoxy, halogenated alkoxy, condensing ring, heterocyclic ring, and cycloalkyl.

It is preferred in the practice of this invention that the alkyl moieties and the alkyl portions of the alkoxy moieties have up to about six carbon atoms in straight or branched chain configuration, such as methyl, ethyl, n-propyl, isopropyl, etc. It is preferred that the aryl moieties and the aryl portion of the aryloxy moieties have one or two rings therein, such as phenyl or naphthyl. It is preferred that in those moieties set forth above which have halogens therein that about 3 to 5 halogens selected from at least one member of the group consisting of fluorine, chlorine and bromine be present.

Typical representatives of these novel compounds are:

(Di-n-butyl-di(benzotriazolephenoxy-2)-tin) (M.P. 74°C)

(Dimethyl-di(benzotriazolephenoxy-2)-silane) (M.P. 68°C)

The stabilizers of this invention can be manufactured by the reaction of phenolic compounds having a benzotriazo group in the ortho position in relation to the OH group with reactive compounds of silicon or tin.

By reactive compounds of silicon or tin are meant the acid anhydrides, acids, halides, esters, alcoholates, or phenolates, hydrides, metal alkyl hydrides, metal alkyls, metal alkenyls, metal alkylhalides, metal aryls and metal aryl halides. These compounds can best be described by the following general formula:

$$R_n \cdot Z \cdot Y_{4-n}$$

wherein R, Z and n have the same meaning as described previously, and Y can be identical or different radicals from the following groups: hydrogen, hydroxy, oxy, (with reference to one atom of the elements from the silicon or tin group) and halogens (chlorine, bromine, iodine). Instead of having R = phenoxy radical, halogen-substituted radicals can also be used which preferably have 3 and more halogen atoms, such as 2,4,6-tribromophenoxy radicals, pentachlorophenoxy radicals, and the like. In the above formula, bisphenols can take the place of two R radicals.

An example of a reactive compound from the halide group is $SiCl_4$, and $SnCl_4$, and an example of a metal alkyl halide is di-n-butyl tin dichloride. The following can be cited as esters or alcoholates and phenolates: tetramethoxysilane, tetraethoxysilane, tetraphenoxysilane, and the like.

In addition to the above-mentioned esters, alcoholates and phenolates, mixed compounds or the alkyl or aryl metal ester type can be used. An example of such a compound is di-(n-butyl)-di-(methoxy)-tin. The dialkyl tin hydrides are examples of the hydride group.

By phenolic compounds which have a benzotriazo group in the ortho position in relation to the OH group are meant compounds of the general formula:

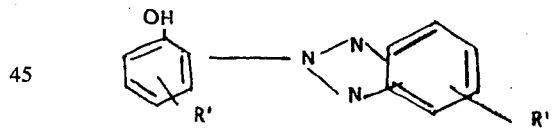

In this formula, R' has the same meaning as set forth above. Typical representatives of the phenolic compounds that can be used for the reaction with the above-mentioned reactive compounds of silicon and tin are: 2-hydroxyphenylbenzotriazole and derivatives thereof.

The above-named new compounds can be manufactured by various methods which depend, however, on the nature of the starting materials.

The new compounds can be obtained, for example, by the trans-esterification of a lower alkoxy ester of one of the above-named elements with one of the phenolic compounds. The trans-esterification, however, can also be performed directly in the fused sinte in a prior-art manner, such as by the reaction of di-n-butyl-tin-dimethoxide with 2-hydroxyphenylbenzotriazole. The removal of the separated lower alkanols is best performed first at normal pressure and then under a vacuum. Alkali catalysts, such as alkali alcoholates or alkali salts of the phenolic compounds used can serve as accelerators for this reaction. The trans-esterification performed with the said phenolic compounds can also take place in solvents which form an azeotrope with the alkanol that is liberated. For example, the reaction of tetraethoxysilane with 2-hydroxyphenylbenzotriazole can be performed in inert solvents such as benzene and toluene, which form an azeotrope with the ethanol.

These new compounds can furthermore be produced by the reaction of halides with the desired phenolic compounds in a prior-art manner, also in the presence of acid-binding substances such as pyridine, etc. Amines can also be used as catalysts for the splitting off of halogen hydride. The reaction can best take place at the boiling point of the solvent that is used. The halides can also be reacted with the alkali salts of the phenolic compounds. The manner of the reaction should be adjusted to the reactive starting product of the silicon and tin.

The compounds of the present invention are extraordinarily heat-resistant, which can be shown by thermogravimetric methods of measurement. For example, di-n-butyl-di-(benzotriazophenoxy-2)-tin (compound I) and 2-hydroxyphenylbenzotriazole (compound II) were tested with a thermoscale manufactured by Linseis at a heating rate of 2.5°C per minute, and it was found that the weight-loss temperature, i.e., the temperature at which weight loss attributable to sublimation, or to volatile components occurs, is very high in the described new phenolates. The following weight-loss temperatures were found:

Compound I: 179°C   Compound II: 157°C

Chlorine-containing polymers which can be stabilized according to the present invention include the homopolymers and copolymers of chlorine-containing monomers, the condensation products of chlorine-containing compounds, and materials obtained by the post-chlorination of chlorine-containing or chlorine-free polymeric products. Examples of chlorine-containing polymers of the named types are the homopolymers and copolymers of: vinyl chloride, in both the soft and hard PVC forms, vinylidene chloride, trichlorethylene, chloroprene, trifluoromonochlorethylene, a-chloralkylic acid and its esters, chlorinated styrenes, and others. Also, the condensation products of polyvalent alcohols and the diene addition products of hexachlorocyclopentadiene and unsaturated dicarboxylic acids, as well as postchlorinated polyolefins, such as polyethylene and polyvinyl chloride, etc.

The stabilizers, according to the invention, can be used in quantities of 0.05 to 5 percent of the weight of polymer, preferably in quantities of 0.1 to 1.0 percent by weight.

The new stabilizing agents can also be used in mixture with stabilizers of the prior art.

The addition of the stabilizers can be performed in a prior-art manner. They can be dissolved also in appropriate solvents or plasticizers before being added. In the case of hard PVC, they can be worked in on a roll mixer.

The following examples illustrate the practice of this invention without being limiting thereon.

EXAMPLE 1

70 parts by weight of suspension polyvinyl chloride (PVC) having a K value of 70 were worked for 10 minutes on a roll mixer at 170°C with 28 parts of dioctyl phthalate (plasticizer), 2 parts of epoxidized soybean oil and 0.2 parts of paraffin oil (lubricant) as well as 0.3 parts (0.00043 mol) of di-n-butyl-di-(benzotriazole-phenoxy-2)-tin and 1.2 parts of di-n-butyl-di-(isooctylmercaptothioglycolate)-tin (stabilizers), stripped from the mixer in the form of a film 1 mm thick, and then pressed at 170°C into a sheet 1 mm thick. In the oven test at 180°C, this sheet developed a yellow-brown color after 90 to 105 minutes. In a test on the Padeometer, after exposure to light of 650 kwh, the sheet showed only a slight yellow coloration. In comparison, other sheets manufactured under the same conditions and stabilized only with 1.3 parts of di-n-butyl-di-(isooctylmercaptothioglycolate)-tin and 0.2 parts (0.00085 mol) of 2-hydroxyphenylbenzotriazole showed a definitely brown color in the oven test after only 75 minutes, and turned dark brown in the Padeometer test after 650 kwh of exposure.

EXAMPLE 2

Soft polyvinyl chloride containing 1.5 wt. percent of di-n-butyl-di-(benzotriazolephenoxy)-2-tin was worked on a roller kneader at 170°C. No coloration was observed. For comparison, stabilizing was performed under analogous conditions with 1.5 wt. percent of 2-hydroxyphenylbenzotriazole and a definite brown color was observed.

EXAMPLE 3

Experiment 2 was repeated with hard PVC. The stabilizing was done with 2 wt. percent of di-n-butyl-di-(isooctylmercaptothioglycolate)-tin and 0.2 wt. percent of dimethyl-di-(benzotriazolephenoxy-2)-silane. No color change was observed in the test specimen after 1,500 hours in the xenon test.

What is claimed is:

1. Composition comprising at least one chlorine-containing polymer selected from the group consisting of vinyl chloride polymers, vinylidene chloride polymers, trichloroethylene polymers, chloroprene polymers, trifluoromonochloroethylene polymers, chlorinated styrene polymers, and chlorinated acrylic polymers admixed with a stabilizing amount of at least one compound of the formula:

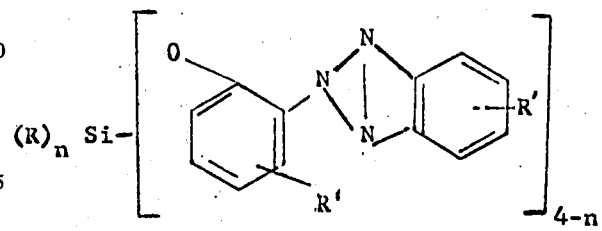

wherein R is a member selected from the group consisting of alkyl of 1-6 carbon atoms, phenyl and naphthyl;
R' is a member selected from the group consisting of hydrogen, alkyl of 1 to 6 carbon atoms, and a condensed ring forming a naphthyl group; and
n is 0, 2 or 3.

2. Composition as claimed in claim 1, containing about 0.05-5 weight per cent of said compound.

3. Composition as claimed in claim 1, containing about 0.1-1 weight per cent of said compound.

4. A composition as claimed in claim 1 wherein said compound is di-n-butyl-di-(benzotriazolephenoxy-2)-silane.

5. A composition as claimed in claim 1 wherein said compound is dimethyl-di-(benzo triazole phenoxy-2)-silane.

6. Composition comprising at least one chlorine-containing polymer selected from the group consisting of vinyl chloride polymers, vinylidene chloride polymers, trichloroethylene polymers, chloroprene polymers, trifluoromonochloroethylene polymers, chlorinated styrene polymers, and chlorinated acrylic polymers admixed with a stabilizing amount of at least one compound of the formula:

$$\left[ Z - \begin{array}{c} O \\ \end{array} \right]_4$$

wherein Z is a member selected from the group consisting of silicon and tin; and R' is a member selected from the group consisting of hydrogen, alkyl of 1 to 6 carbon atoms, and a condensed ring forming a naphthyl group.

* * * * *